(12) United States Patent
Hirama et al.

(10) Patent No.: US 11,190,694 B2
(45) Date of Patent: Nov. 30, 2021

(54) IMAGE STABILIZATION APPARATUS, METHOD OF CONTROLLING THE SAME, AND STORAGE MEDIUM

(71) Applicant: CANON KABUSHIKI KAISHA, Tokyo (JP)

(72) Inventors: Tomohiro Hirama, Tokyo (JP); Hidetaka Uemura, Kawasaki (JP); Michinori Nakajima, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/996,008

(22) Filed: Aug. 18, 2020

(65) Prior Publication Data

US 2021/0058553 A1 Feb. 25, 2021

(30) Foreign Application Priority Data

Aug. 22, 2019 (JP) .............................. JP2019-152170

(51) Int. Cl.
*H04N 5/232* (2006.01)

(52) U.S. Cl.
CPC ..... *H04N 5/23287* (2013.01); *H04N 5/23254* (2013.01); *H04N 5/23258* (2013.01); *H04N 5/23267* (2013.01)

(58) Field of Classification Search
CPC ........... H04N 5/23287; H04N 5/23267; H04N 5/23254; H04N 5/23258; H04N 5/2329
USPC ..................................................... 348/208.1
See application file for complete search history.

(56) References Cited

U.S. PATENT DOCUMENTS

| 8,964,047 B2* | 2/2015 | Robinson ........... H04N 5/23248 348/208.5 |
| 9,413,962 B2* | 8/2016 | Tsubaki .............. H04N 5/23267 |
| 10,447,944 B2* | 10/2019 | Uemura ............. H04N 5/23216 |
| 10,539,764 B2* | 1/2020 | Sasaki ..................... G03B 37/06 |
| 10,551,548 B2* | 2/2020 | Lee ......................... G02B 6/005 |
| 2013/0335565 A1* | 12/2013 | Robinson ........... H04N 5/23267 348/144 |
| 2015/0085149 A1 | 3/2015 | Tsubaki |

(Continued)

FOREIGN PATENT DOCUMENTS

| JP | 3278206 B2 | 4/2002 |
| JP | 2018156036 A | 10/2018 |

OTHER PUBLICATIONS

The above patent documents were cited in a Partial European Search Report dated Jan. 14, 2021, that issued in the corresponding European Patent Application No. 20189114.0.

(Continued)

*Primary Examiner* — Pritham D Prabhakher
(74) *Attorney, Agent, or Firm* — Cowan, Liebowitz & Latman, P.C.

(57) ABSTRACT

An image stabilization apparatus comprises a calculation unit configured to, based on a detection result of shake detection unit for detecting a shake of an image capturing apparatus, calculates an image blur correction amount for correcting an image blur by changing a relative position of a subject image and the image capturing element, wherein the calculation unit, based on information of an imaging lens that is used when capturing a captured image, calculates the image blur correction amount at a different scaling factor for each of a plurality of axes of a two-dimensional plane of the captured image.

23 Claims, 10 Drawing Sheets

(56) References Cited

U.S. PATENT DOCUMENTS

| | | | |
|---|---|---|---|
| 2015/0103189 A1 | 4/2015 | Karpenko | |
| 2016/0360112 A1* | 12/2016 | Shigemitsu | G02B 13/0005 |
| 2017/0192210 A1* | 7/2017 | Sasaki | G02B 5/208 |
| 2017/0332017 A1* | 11/2017 | Robinson | H04N 5/332 |
| 2018/0278856 A1* | 9/2018 | Uemura | H04N 5/23216 |
| 2019/0011679 A1* | 1/2019 | Sasaki | G03B 37/06 |

OTHER PUBLICATIONS

The above patent document was cited in a European Search Report dated May 26, 2021, that issued in the corresponding European Patent Application No. 20189114.0.

* cited by examiner

IMAGE STABILIZATION APPARATUS, METHOD OF CONTROLLING THE SAME, AND STORAGE MEDIUM

BACKGROUND OF THE INVENTION

Field of the Invention

The present invention relates to a technique for correcting, in an image capturing apparatus, image blur caused by shaking of the apparatus.

Description of the Related Art

In recent years, many image capturing techniques using an anamorphic lens have come to be used as techniques for image capturing in the field of video. An anamorphic lens can compress a horizontal direction of a captured image by a specific scaling factor, and by decompressing the compressed video by the scaling factor by post processing, can obtain video with a cinescope aspect ratio (2.39:1).

A method of correcting image blur in relation to an image captured using the anamorphic lens has been proposed.

In Japanese Patent No. 3278206, the following technique has been disclosed. In a case where motion vectors are detected from video captured using an anamorphic lens, and the image blur is corrected after decompressing the compression in the horizontal direction, since the motion vectors are detected from the image that is compressed in the horizontal direction, the motion vectors are detected to be smaller than in reality. Accordingly, motion vectors that take into consideration the compression are used for image blur correction.

However, in Japanese Patent No. 3278206, there is the following problem. In Japanese Patent No. 3278206, after decompressing the compression in the horizontal direction of the video captured using the anamorphic lens, it is possible to correct image blur using the motion vector that take into consideration the compression. However, on the other hand, when image stabilization is performed with respect to an image that is still compressed, image blur is not corrected correctly due to over correction. Also, over correction similarly occurs in the case where image blur is corrected by obtaining vibration information from an inertia sensor such as an angular velocity sensor or the like separately from motion vectors in relation to the still compressed image, and so it is the image blur is not corrected correctly.

SUMMARY OF THE INVENTION

The present invention was conceived of in light of the aforementioned problems, and realizes suitable image stabilization control for video captured using an imaging lens for which a compression scaling factor differs between a horizontal direction and a vertical direction for a captured video such as in the case of an anamorphic lens.

According to a first aspect of the present invention, there is provided an image stabilization apparatus, comprising: at least one processor or circuit configured to function as: a calculation unit configured to, based on a detection result of shake detector for detecting a shake of an image capturing apparatus, calculate an image blur correction amount for correcting an image blur, wherein the calculation unit, based on information of an imaging lens that is used when capturing a captured image, calculates the image blur correction amount at a different scaling factor for each of a plurality of axes of a two-dimensional plane of the captured image.

According to a second aspect of the present invention, there is provided a method of controlling an image stabilization apparatus, the control method comprising: based on a detection result of shake detector for detecting a shake of an image capturing apparatus, calculating an image blur correction amount for correcting an image blur, wherein based on information of an imaging lens that is used when capturing a captured image, the image blur correction amount at a different scaling factor for each of a plurality of axes of a two-dimensional plane of the captured image is calculated.

Further features of the present invention will become apparent from the following description of exemplary embodiments with reference to the attached drawings.

DESCRIPTION OF THE EMBODIMENTS

Figure 1:
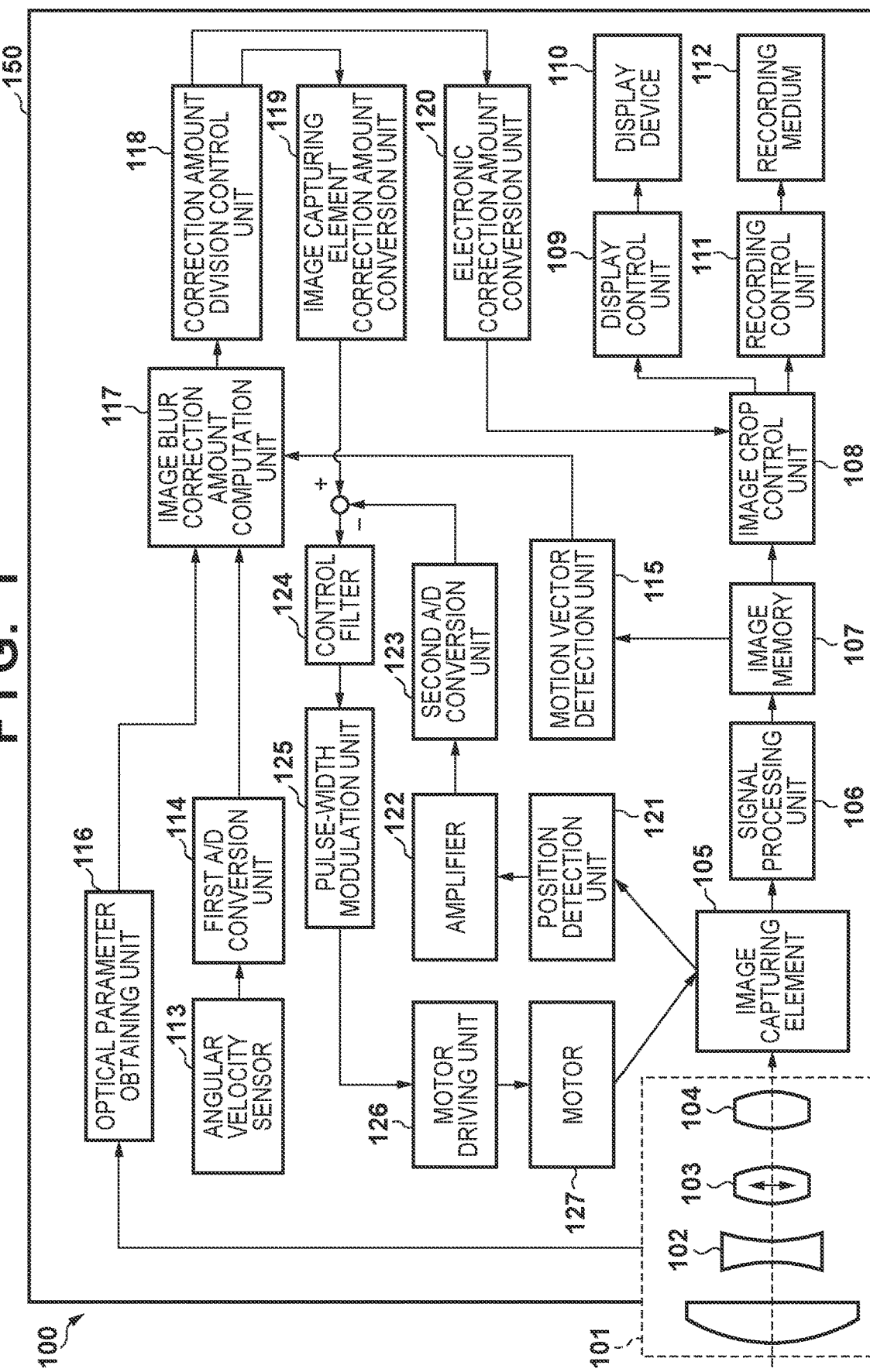
FIG. 1 is a block diagram illustrating a configuration of a digital camera according to a first embodiment of the present invention.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

FIG. 1 is a block diagram illustrating a configuration of an interchangeable lens digital camera (image capturing apparatus) 100 for capturing still images and moving images and having an image stabilization apparatus according to a first embodiment of the present invention. Note that the present invention can also be applied to a fixed lens camera rather than just an interchangeable lens camera. Also, limitation is not made to digital cameras, and it is possible to apply the invention to various image stabilization apparatuses.

Figure 2:
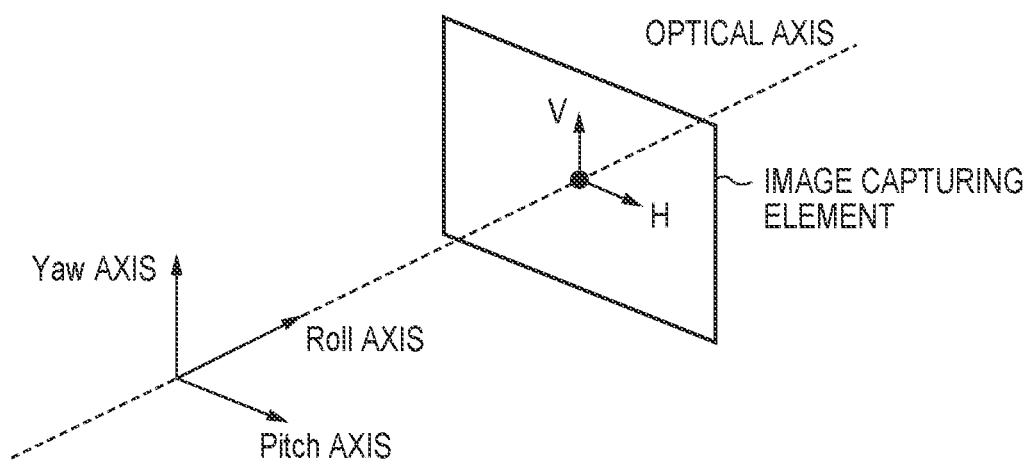
FIG. 2 in a view illustrating a coordinate system of the digital camera.

Note that in the description of the embodiments below, vibration that is caused to occur in the image capturing apparatus is expressed as "shake", and shaking of a captured image that occurs due to shaking of the image capturing apparatus is expressed as "image blur". Also, as illustrated in FIG. 2, as axes of detection that are orthogonal to each other on a plane orthogonal to an optical axis, a rotational axis that extends in a vertical direction will be described as a yaw axis, and a rotational axis that extends in a horizontal direction will be described as a pitch axis, and a rotational axis that extends in the optical axis direction will be described as a roll axis.

In FIG. 1, a digital camera 100 is configured from an imaging lens 101 and a camera body 150, and the imaging lens 101 is used by attaching it to the camera body 150.

The imaging lens 101 comprises a zoom lens 102 which performs magnification, a correction optical system 103 (first image stabilization unit) which is a shift lens for performing image stabilization, and a focus lens 104 for performing focal point adjustment. The correction optical system 103 performs an image stabilization by changing a relative position of an image capturing element 105 with respect to a subject image formed by the imaging lens 101. These lens elements perform zooming, focusing, and image stabilization operations, and cause a subject image to be focused on an image capture plane of the image capturing element 105. Note that the imaging lens 101, in the present embodiment, is envisioned to be an anamorphic lens for which image scaling differs in the horizontal and vertical axis directions respectively, which are orthogonal in a two-dimensional plane. The anamorphic lens is envisioned to be able to compress a horizontal direction of a captured image by a specific scaling factor, and by decompressing (returning) by the compressed scaling factor by post processing, it is possible to obtain video with a cinescope aspect ratio (2.39:1).

The image capturing element 105 is constituted by, for example, an XY addressing-based CMOS (Complementary Metal Oxide Semiconductor) image sensor or the like. Also, the imaging lens 101 accumulates charge by photoelectric conversion of an optical image that the imaging lens 101 forms, and by reading that charge, generates an image signal (captured image) from a signal of a plurality of pixels, and supplies the image signal to a signal processing unit 106.

Also, the image capturing element 105, by a motor 127, can move in a direction orthogonal to an optical axis of the imaging lens 101. By movement in a horizontal direction and a vertical direction in a plane orthogonal to the optical axis of the image capturing element 105, and rotational movement about the optical axis, image blur of a subject image formed by the imaging lens 101 is corrected (second image stabilization unit). The subject image corrected for image blur is photoelectrically converted by the image capturing element 105, and the obtained image signal is supplied to the signal processing unit 106.

The signal processing unit 106 performs signal processing such as white balance adjustment processing and gamma correction processing on the image signal outputted from the image capturing element 105, and the frame image generated as the result thereof is stored in an image memory 107.

An image crop control unit 108 generates a new frame image by cropping a predetermined region of the frame image stored in the image memory 107, and supplying it to a display control unit 109 and a recording control unit 111. At that time, by moving the cropping position of a predetermined region in accordance with the shaking of the digital camera 100, movement (image blur) of a position of a subject between frames that occurs due to the shaking of the digital camera 100 is corrected. The image crop control unit 108 configures an electronic image blur correction means (third image stabilization unit). Note that a sequence of operations performed by the signal processing unit 106 and the image crop control unit 108 is executed at a frequency of 60 Hz and moving image data is generated thereby in a case of a video signal that complies with with an NTSC format, for example.

In each embodiment described below, it is assumed that the cropping processing is performed in relation to a captured image for which horizontal compression by an anamorphic lens is performed and processing to return the compressed scaling factor has not been performed. The processing for decompressing the captured image compressed by the anamorphic lens is typically referred to as de-squeeze processing, but the image size increases by executing the de-squeeze processing. For this reason, the processing load will be smaller when executing cropping processing prior to de-squeeze processing than when executing the cropping processing after the de-squeeze processing, and it is possible to handle capturing even at a high-speed frame rate.

The display control unit 109 fulfills an electronic viewfinder function by causing an image (through image) based on a video signal supplied from the image crop control unit 108 to be displayed on the display device. Also, the display control unit 109, in accordance with intended use, causes a setting menu image, a recorded image, or the like to be displayed on a display device 110. The display device 110 comprises a liquid crystal display element (LCD) or the like.

The recording control unit 111, when a user performs an operation to instruct the start of recording, controls to record, onto a recording medium 112, moving-image data, still-image data, metadata, or the like supplied from the image memory 107. The recording medium 112 comprises an information recording medium such as a semiconductor memory or a magnetic recording medium such as a hard disk or the like.

An angular velocity sensor 113 detects a shake of the digital camera 100. The detected shake signal (detection result) is supplied to an image blur correction amount computation unit 117 described later, and is used to control image stabilization. The angular velocity sensor 113 is arranged so as to form detection axes that are orthogonal to each other on a plane that is orthogonal to the optical axis. More specifically, the angular velocity sensor 113 has three angular velocity sensors so as to be able to detect shake about the yaw axis which is an axis that extends in a vertical direction, shake about the pitch axis which is an axis that extends in a horizontal direction, and shake about the roll axis which is an axis that extends in an optical axis direction; that is, shake about three axes. The angular velocity sensor 113 detects an angular velocity of a shake of the digital camera 100, and outputs a voltage in accordance with that angular velocity.

A first A/D conversion unit 114 converts a voltage outputted from the angular velocity sensor 113 into digital angular velocity data, and supplies the angular velocity data to the image blur correction amount computation unit 117, which will be described later.

A motion vector detection unit 115 detects motion vectors in two directions (horizontal and vertical directions) that are orthogonal to each other on a plane orthogonal to the optical axis. The method for detecting the motion vectors may be a correlation method or a block matching method. In one example, the block matching method is assumed to be used in the motion vector detection unit 115.

In the block matching method, first an input image signal is divided into a plurality of appropriately sized blocks (for example, 16×16 pixels), and a difference with respect to pixels of a fixed range of a previous field or frame is calculated in units of blocks. Also, a block in the previous field or frame for which a sum of the absolute values of this difference is a minimum is searched for, and a relative shift between two blocks is detected as a motion vector for that block. As a result, it is possible to derive movement amounts (specifically, motion vectors) for each of the vertical direction and the horizontal direction in units of pixels.

Such motion vectors indicate a movement amount per unit time for sequential captured images, specifically a movement amount of the digital camera 100. Also, in the case where a motion vector cannot be successfully detected, a motion vector error determination is made. As one example of a motion vector error determination method, it is possible to consider determining the motion vector error under the condition that a luminance signal is small, a detected value is a peak value, or the like. The detected motion vector is supplied to the later-described image blur correction amount computation unit 117 where a horizontal vector is H_Vect and a vertical vector is V_Vect, and is used for image stabilization control.

An optical parameter obtaining unit 116 obtains, from the imaging lens 101, characteristic information of the imaging lens such as a focal length, an aperture value, a focus position, a shift lens movement amount, a distortion rate, an anamorphic lens compression factor, an effective image diameter or the like. Such information need not be obtained directly from the imaging lens 101, and configuration may be taken so as to obtain a value inputted via a user interface or the like. The obtained information is supplied to the image blur correction amount computation unit 117, and used for controlling image stabilization.

The image blur correction amount computation unit 117 calculated a correction amount for correcting image blur that occurs due to shaking of the digital camera 100, and supplies the correction amount to a correction amount division control unit 118. Note that the image blur correction amount calculated by the image blur correction amount computation unit 117 is not a correction amount of each of the plurality of image stabilization units, but rather an image blur correction amount for the entire digital camera 100.

The correction amount division control unit 118 divides the image blur correction amount for the digital camera on the whole calculated by the image blur correction amount computation unit 117 into correction amounts for corrections by the plurality of image stabilization units. In the present embodiment, as one example, the image blur correction amount is divided into a correction amount for correcting by movement of the image capturing element 105 and a correction amount for correction by the image crop control unit 108.

An image capturing element correction amount conversion unit 119 converts the correction amount outputted from the correction amount division control unit 118 into a movement amount for suitably correcting image blur by the image capturing element 105, and outputs the movement amount as a drive target position.

An electronic correction amount conversion unit 120 converts the correction amount outputted from the correction amount division control unit 118 into a cropping position for suitably correcting an image blur by the image crop control unit 108, and sets the cropping position to the image crop control unit 108.

A position detection unit 121 detects a movement position of the image capturing element 105, and outputs a voltage in accordance with the position. The output voltage of the position detection unit 121 is amplified by an amplifier 122 to a signal in a suitable voltage range. Output of the amplifier 122 is converted into digital position data by a second A/D conversion unit 123.

Deviation data which is a difference of position data with respect to a drive target position of the image capturing element 105 is inputted into a control filter 124. The control filter 124 applies various signal processing such as amplification processing, phase compensation processing and the like in relation to the inputted data, and outputs the processed result to a pulse-width modulation unit 125. The pulse-width modulation unit 125 modulates output of the control filter 124 into a waveform (specifically, a PWM waveform) that causes a duty ratio of the pulse wave to change, and supplies the waveform to a motor driving unit 126.

The motor 127 is, for example, a voice coil type motor, and by the motor 127 being driven by the motor driving unit 126, the image capturing element 105 is moved in a direction orthogonal to the optical axis. Then, a feedback loop in which the position of the moved image capturing element 105 is detected by the position detection unit 121 and the next deviation data is calculated is formed. Then, control is performed so as to make the difference between the drive target position and position data smaller. By this, the driving of the image capturing element 105 is controlled so as to track the drive target position. Note that the motor 127 may be a vibration motor that generates a driving force by causing a vibration plate to vibrate by a piezoelectric element.

Figure 3:
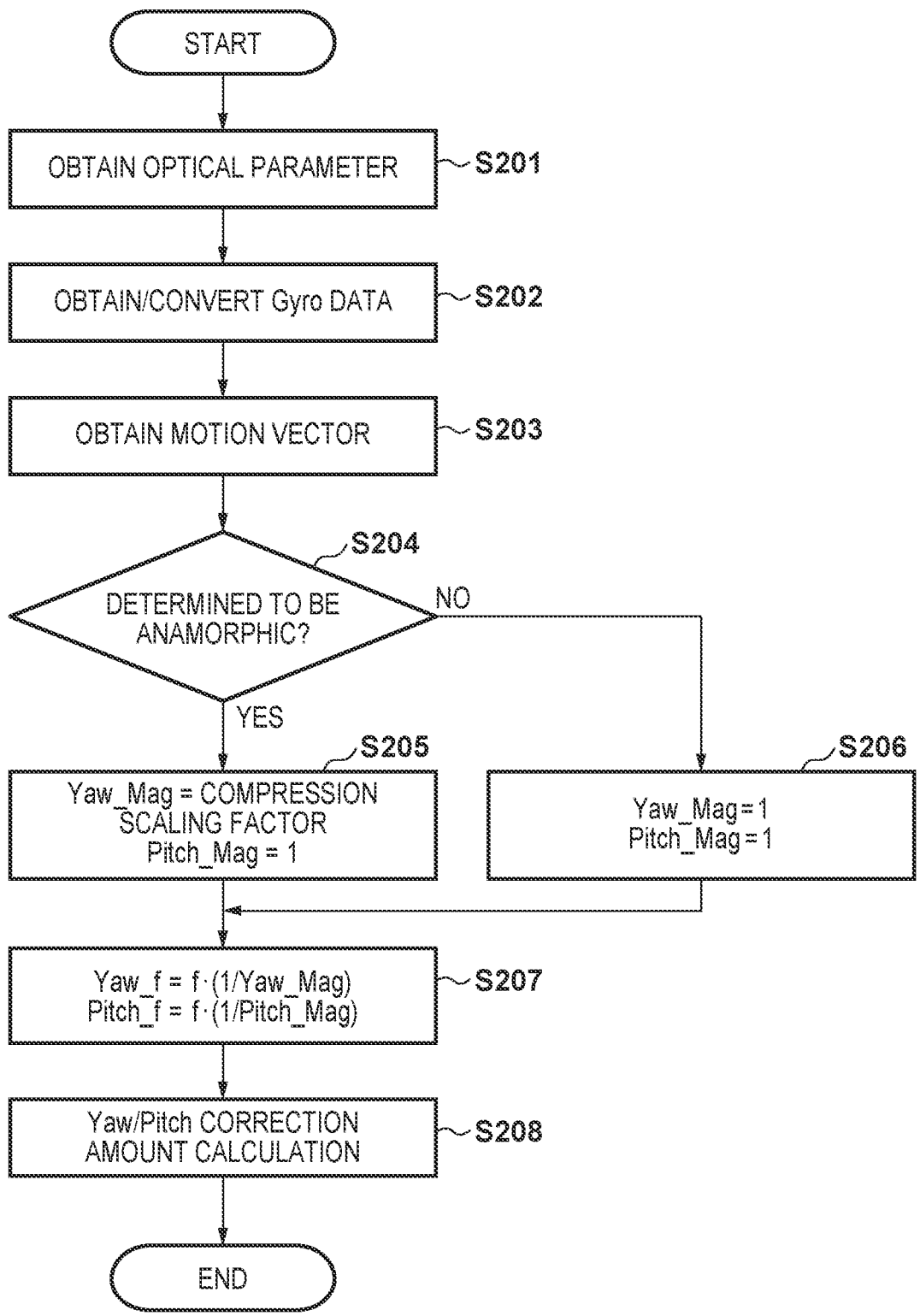
FIG. 3 is a flowchart for describing an operation of calculating an image blur correction amount in the first embodiment.

FIG. 3 is a flowchart for describing a correction amount calculation operation of the image blur correction amount computation unit 117. Note that the processing illustrated in FIG. 3 is executed repeatedly at a predetermined frequency such as 60 Hz or the like in the case of a video signal that complies with the NTSC format, for example.

First, in step S201, optical parameter information of the imaging lens at the time of capturing such as the focal length, the aperture value, the focus position, the distortion rate, the anamorphic lens compression factor, the effective image diameter, or the like is obtained. The obtainment of the information may be performed via electrical communication with the imaging lens 101, or configuration may be taken such that a value inputted manually by using a user interface of the digital camera 100 is obtained.

In step S202, by the angular velocity sensor 113, shaking of the digital camera 100 about the yaw axis and the pitch axis is detected. Note that since the vibration information from the angular velocity sensor 113 is angular velocity information, by a low-frequency component being removed by an HPF, and further integrated by an integrator, a conversion from angular velocity information into angular displacement information is made. In the integration computation performed here, an incomplete integration is used to avoid saturation, and a primary LPF that is conventionally known is used. The converted angular displacement data is respectively made to be Yaw_rad and Pitch_rad.

In step S203, using the previous frame and the current frame, a motion vector is detected, and motion vector data H_Vect and V_Vect are calculated.

In step S204, using the anamorphic lens compression factor obtained in step S201, it is determined whether an anamorphic lens is attached to the camera body 150. In a case in which it is determined that an anamorphic lens is attached, the processing advances to step S205, and in a case where it is determined that in an anamorphic lens is not attached, the processing advances to step S206.

In step S205, the imaging lens compression scaling factor is set for each of the horizontal direction and the vertical direction that are orthogonal to each other on a plane orthogonal to the optical axis. More specifically, the compression scaling factors for the imaging lens in the horizontal direction and the vertical direction are respectively Yaw_Mag and Pitch_Mag, and the anamorphic lens compression factor obtained in step S201 is set to Yaw_Mag, and 1 which indicates that full size is set for Pitch_Mag.

In step S206, similarly to step S205, sets the compression scaling factors for the imaging lens in the horizontal direction and the vertical direction which are orthogonal to each other on a plane orthogonal to the optical axis. Here, the compression scaling factors of the imaging lens in the horizontal direction and the vertical direction are respectively Yaw_Mag and Pitch_Mag, and both Yaw_Mag and Pitch_Mag are set to 1 which indicates full size.

In step S207, from the compression scaling factors of the imaging lens set in step S205 or in step S206 and the focal length information obtained in step S201, a virtual focal length is calculated for each image stabilization axis. More specifically, when the focal length obtained in in step S201 is f and the virtual focal lengths are respectively Yaw_f and Pitch_f, description according to (Equation 1) and (Equation 2) is possible.

$$Yaw\_f = f(1/Yaw\_Mag) \quad \text{(Equation 1)}$$

$$Pitch\_f = f(1/Pitch\_Mag) \quad \text{(Equation 2)}$$

In step S208, from angular displacement data Yaw_rad and Pitch_rad converted in step S202, motion vector data H_Vect and V_Vect obtained in step S203, and virtual focal lengths Yaw_f and Pitch_f calculated in step S207, an image blur correction amount about each of the Yaw axis and the Pitch axis is calculated. More specifically, when the image blur correction amounts are made to be H_Total and V_Total respectively, description according to (Equation 3) and (Equation 4) is possible.

$$H\_Total = Yaw\_f \cdot \tan(Yaw\_rad) + H\_Vect \quad \text{(Equation 3)}$$

$$V\_Total = Pitch\_f \cdot \tan(Pitch\_rad) + V\_Vect \quad \text{(Equation 4)}$$

Next, the correction amount division control unit 118 for dividing the entire image blur correction amount for the digital camera 100 obtained as described above will be described.

The correction amount division control unit 118 divides the image blur correction amounts H_Total and V_Total calculated by the image blur correction amount computation unit 117 into the correction amounts Y_Correct and Pitch Correct used for image stabilization (second image stabilization) by movement of the image capturing element 105 and correction amounts H_hom and V_hom used for electronic image blur correction (third image stabilization). Next, the respective correction amounts are outputted to the image capturing element correction amount conversion unit 119 and the electronic correction amount conversion unit 120. Note that, for the division method, configuration may be taken to change the ratio of image capturing element correction amount and electronic correction amount in accordance with the image blur correction amount calculated based on the angular velocity sensor 113, and another method may also be used.

Figure 4:
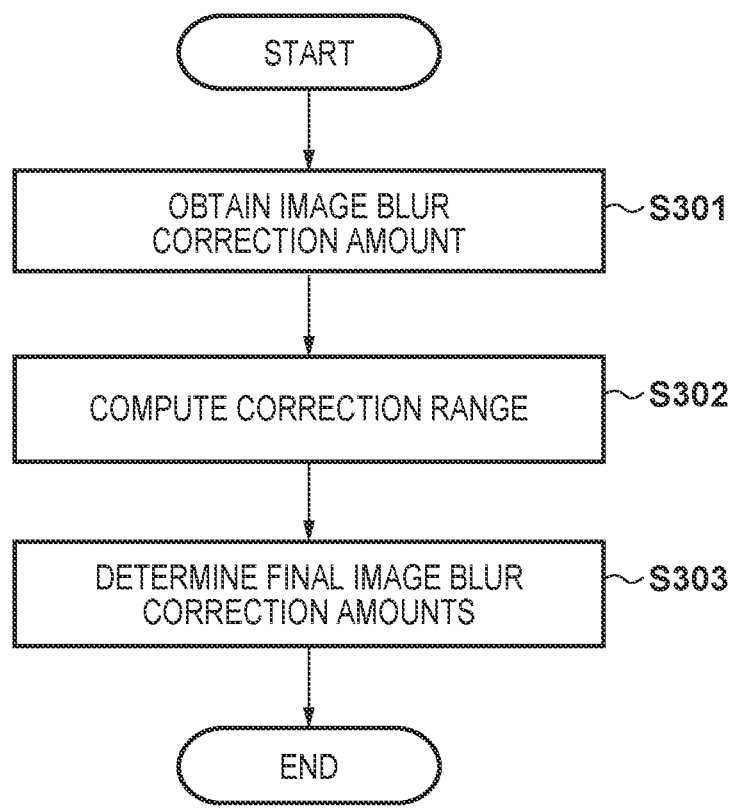
FIG. 4 is a flowchart for describing an electronic correction amount conversion operation in the first embodiment.

FIG. 4 is a flowchart for describing a conversion operation in the electronic correction amount conversion unit 120. Note that the processing illustrated in FIG. 4 is executed repeatedly at a predetermined frequency such as 60 Hz or the like in the case of a video signal that complies with the NTSC format, for example.

First, in step S301, the image blur correction amounts H_hom and V_hom calculated by the correction amount division control unit 118 are obtained.

In step S302, an image stabilization range is calculated. The image stabilization range is set based on effective image diameter information obtained by the optical parameter obtaining unit 116, a readout range of the image capturing element 105, a movable range of the image crop control unit 108, and the like so as not to hit the edge, and a limitation is put on the image blur correction amounts H_hom and V_hom thereby. The image blur correction amounts after the limitation is applied are H_hom_final and V_hom_final.

In step S303, the image blur correction amounts H_hom_final and V_hom_final calculated in step S302 are determined to be the image blur correction amounts to be used by the image crop control unit 108.

As described above, in the present embodiment, when an anamorphic lens is attached, the correction amount is changed for each image stabilization axis, an erroneous image stabilization due to a difference in compression scaling factor is prevented, and suitable image stabilization is realized. Accordingly, even in a case where a shake occurs when an anamorphic lens is attached, it is possible to realize suitable image stabilization control without over correction.

Also, in the present embodiment, a case in which a second image stabilization unit (image stabilization by movement of the image capturing element) and a third image stabilization unit (electronic image blur correction) are used will be described. However, configuration may be taken so as to apply the present invention to a case where instead of the second image stabilization unit, a first image stabilization unit (an image stabilization by a shift lens arranged within the imaging lens) is used or all three types of image stabilization units are used.

Second Embodiment

Figure 5:
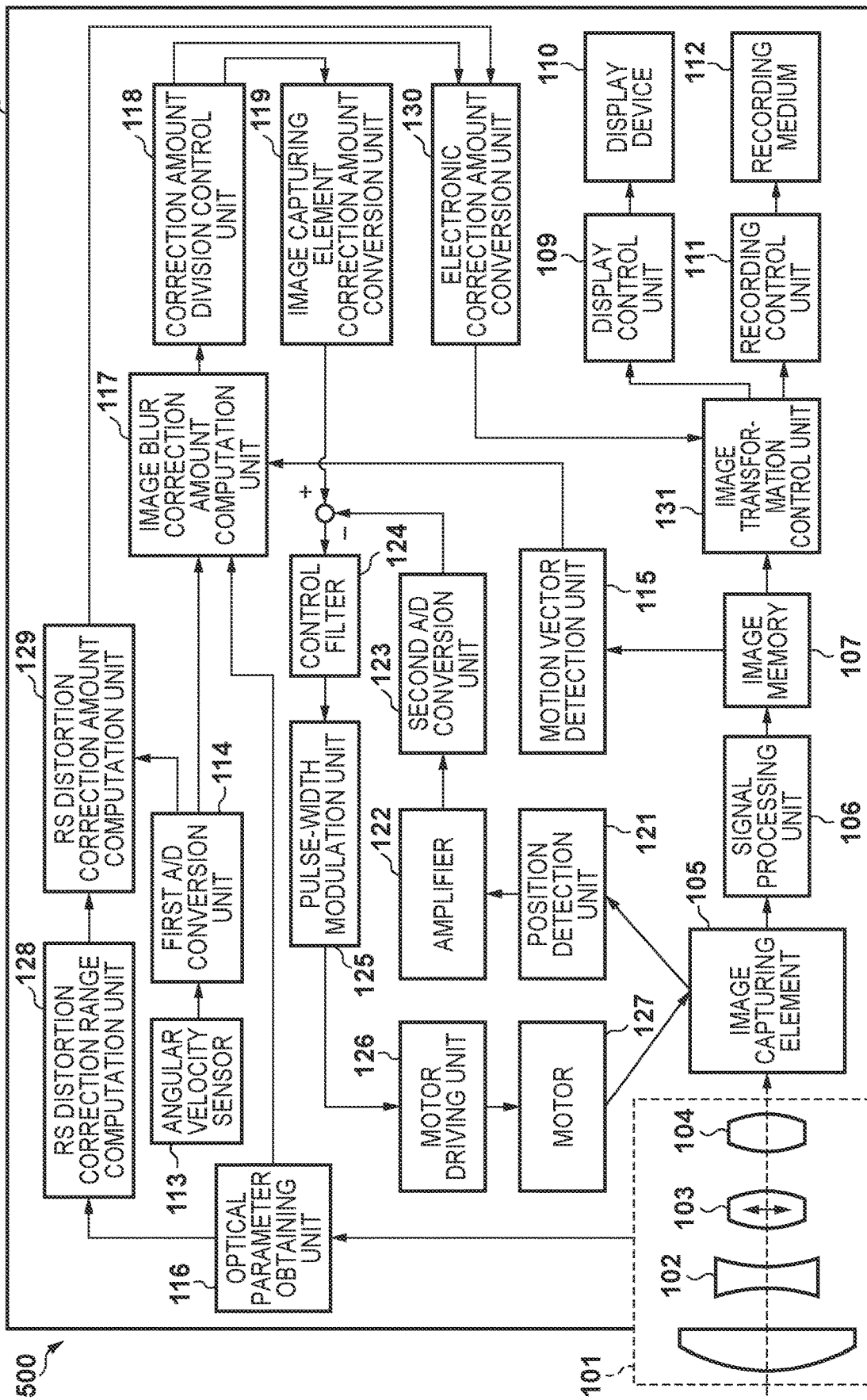
FIG. 5 is a block diagram illustrating a configuration of a digital camera according to a second embodiment.

FIG. 5 is a block diagram illustrating a configuration of an interchangeable-lens digital camera (image capturing apparatus) 500 for performing capturing of still images and moving images and that has an image stabilization apparatus according to a second embodiment of the present invention. Note that elements that are the same as those illustrated in FIG. 1 will be given the same reference numerals, and will not be described.

A camera body 151 of the digital camera 500 illustrated in FIG. 5 corresponds to the configuration of FIG. 1, and an RS distortion correction range computation unit 128 and an RS distortion correction amount computation unit 129 have been added. Here, RS is an abbreviation of rolling shutter, which is described later. Furthermore, the electronic correction amount conversion unit 120 and the image crop control unit 108 are removed, and an electronic correction amount conversion unit 130 whose control is different to the electronic correction amount conversion unit 120, and an image transformation control unit 131 have been added.

Note that in the present embodiment, the computation of the image blur correction amount corresponding to the anamorphic lens is performed similarly to the correction amount calculation operation of the image blur correction amount computation unit 117 in the first embodiment illustrated in FIG. 3.

Figure 6:
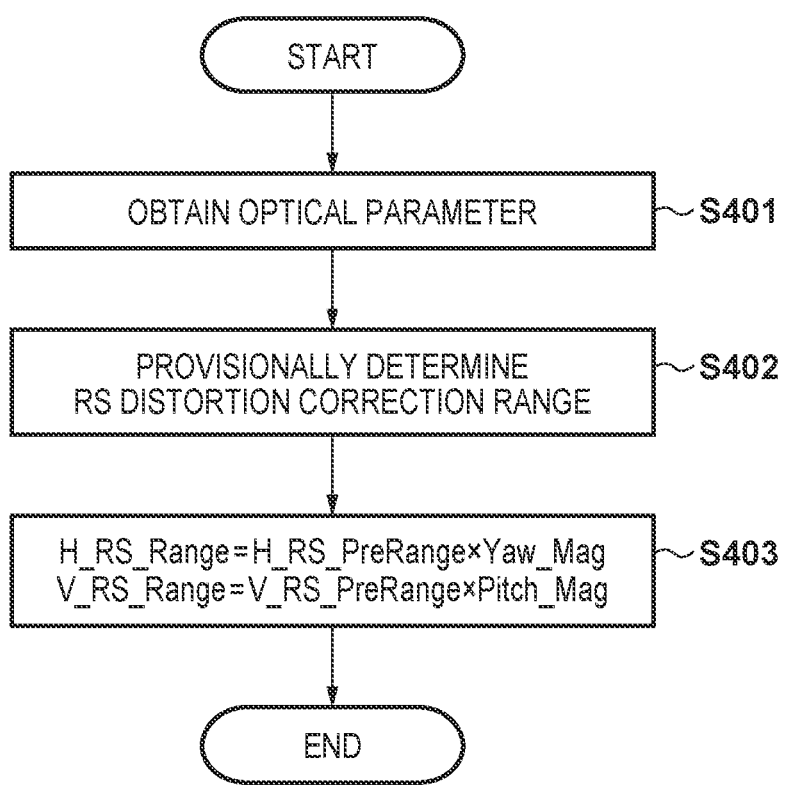
FIG. 6 is a flowchart for describing an RS distortion correction range calculation in the second embodiment.

FIG. 6 is a flowchart illustrating a correction range calculation operation by the RS distortion correction range computation unit 128. Note that the processing illustrated in FIG. 6 is repeatedly executed at a predetermined frequency such as 60 Hz in the case of a video signal that complies with the NTSC format, for example.

First, in step S401, optical parameter information of the imaging lens for when capturing, such as the focal length, the aperture value, the focus position, the distortion rate, the anamorphic lens compression factor, the effective image diameter, and the like is obtained. The obtaining of the information may be performed via electrical communication with the imaging lens 101, and configuration may be taken so as obtain a value inputted manually using a user interface of the digital camera 500.

In step S402, the RS distortion correction range is provisionally determined for each focal length. The RS distortion correction range may be determined according to a correction table for each focal length decided in advance, and configuration may be taken so as to change it depending on the size of the shake signal detected by the angular velocity sensor 113 of FIG. 5.

In step S403, the correction range provisionally determined in step S402 is multiplied by the anamorphic lens scaling factor, and the correction range is thereby determined. The image captured by the anamorphic lens must be decompressed from compressed scaling factor by post-processing. At that time, if decompression from the scaling factor is performed with an RS distortion still remaining, the RS distortion will become more prominently apparent than in the case where the anamorphic lens is not attached. For this reason, control to increase the correction ranges more than usual is performed in proportion to the scaling factor of the anamorphic lens. When the provisionally determined correction ranges are respectively H_RS_PreRange and V_RS_PreRange, and the determined ranges are H_RS_Range and V_RS_Range, description according to (Equation 5) and (Equation 6) is possible.

$$H\_RS\_Range = H\_RS\_PreRange \cdot Yaw\_Mag \quad \text{(Equation 5)}$$

$$V\_RS\_Range = V\_RS\_PreRange \cdot Pitch\_Mag \quad \text{(Equation 6)}$$

In the RS distortion correction amount computation unit 129, based on vibration information that the angular velocity 113 sensor of FIG. 5 detected and the correction ranges determined by the RS distortion correction range computation unit 128, the RS distortion correction amount is calculated, and outputted to the electronic correction amount conversion unit 130. In the present embodiment, a rolling shutter distortion that occurs when a stationary subject is captured after moving the digital camera 500 is described, and description is only given for the H direction (horizontal direction).

To correct the rolling shutter distortion due to a camera shake or sway when walking, it is necessary to calculate, by using an angular velocity sensor or the like, the shake amount on the image capture plane produced during an exposure duration time difference for a pixel of interest when the exposure duration of a pixel on the image capturing element is made to be a reference. Here, since the exposure duration time difference is small enough that it can be ignored between pixels on the same line in the horizontal direction, pixels within the same line are treated as having the same exposure duration, and the shake amount that occurs due to the time difference in exposure duration between lines is calculated. However, when the shake amount for all lines is calculated and saved, the load on the system of a large operation amount becomes larger, and it is necessary to increase the memory capacity. Accordingly, in the present embodiment, the shake amount corresponding to lines thinned discretely is calculated, and the shake amount corresponding to the lines therebetween is obtained by interpolation.

Figure 7:
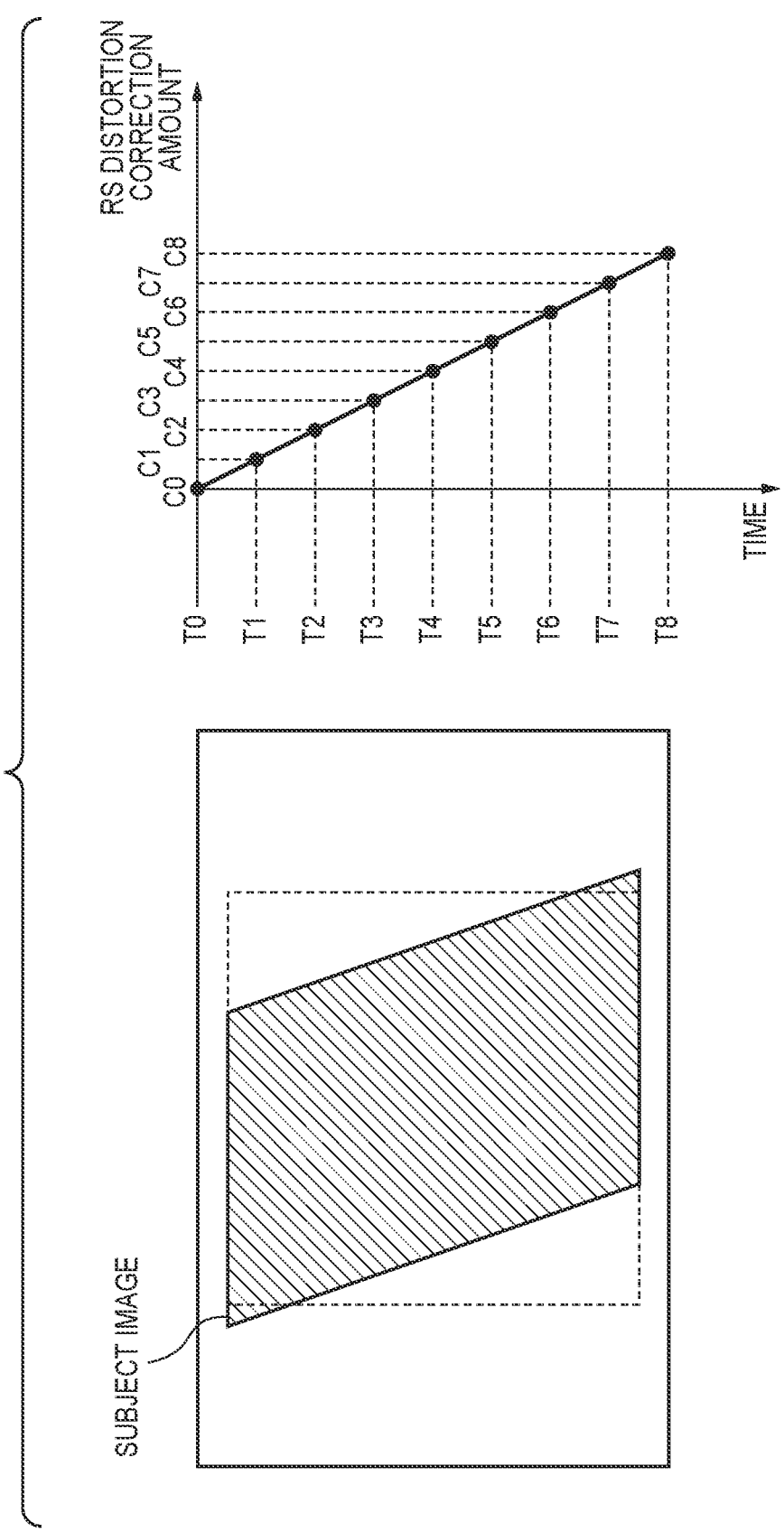
FIG. 7 is a view for describing an RS distortion in the second embodiment.

FIG. 7 is a graph in which the lines configuring one screen are thinned to nine lines L0 to L8, time is the ordinate, the RS distortion correction amount is the abscissa, and the RS distortion correction amounts C0 to C8 are plotted for times T0 to T8.

The times T0 to T8 are time differences in exposure duration for each line when line L0 is made to be the reference, and the RS distortion correction amounts C0 to C8 are calculated from the shake amounts produced between the times corresponding to the respective lines from the time T0. Also, based on the discrete RS distortion correction amounts C0 to C8, using a publicly known method such as linear interpolation, polynomial approximation, the least squares method, or the like, the RS distortion correction amount corresponding to each line of the captured image is calculated.

After that, based on the correction ranges H_RS_Range and V_RS_Range determined by the RS distortion correction range computation unit 128, the range of the calculated RS distortion correction amounts C0 to C8 is limited, and outputted to the electronic correction amount conversion unit 130.

The electronic correction amount conversion unit 130 converts the image blur correction amount supplied from the correction amount division control unit 118 and the RS distortion correction amount supplied from the RS distortion correction amount computation unit 129 into a cropping position/transformation coordinates for suitably correcting the image blur and the RS distortion in the image transformation control unit 131. Then, these are set to the image transformation control unit 131.

Note that the range in which control by the image transformation control unit 131 is possible is a range that combines the image stabilization range necessary when amending image blur and the RS distortion correction range necessary when correcting RS distortion, and so there is a tradeoff relationship between the image stabilization range and the RS distortion correction range. Accordingly, limitation is applied to the image blur correction amounts H_hom and V_hom in the electronic image blur correction so not to hit the edge from the effective image diameter information obtained in the optical parameter obtaining unit 116 of FIG. 5, the readout range of the image capturing element 105, the movable range of the image crop control unit 108, the RS distortion correction range calculated in the RS distortion correction range computation unit 128, and the like. The image blur correction amounts after the limitation is applied are H_hom_final and V_hom_final, and the image blur correction amounts are determined.

The image transformation control unit 131 crops a predetermined region of the frame image stored in the image memory 107, generates a new frame image by a geometric transformation, and supplies the frame image to the display control unit 109 and the recording control unit 111. At that time, by moving the cropping position of a predetermined region in accordance with the shaking of the digital camera 500, movement (image blur) of a position of a subject between frames that occurs due to the shaking of the digital camera 500 is corrected. Also, it is possible to simultaneously realize an RS distortion correction function that corrects the RS distortion that occurs due to shaking of the digital camera 100. Note that a sequence of operations performed by the signal processing unit 106 and the image crop control unit 108 is executed at a frequency of 60 Hz in the case of a video signal that complies with the NTSC format, for example, and moving image data is generated thereby.

As described above, by virtue of the present embodiment, when an anamorphic lens is attached, a correction amount changes for each image stabilization axis, and an erroneous image stabilization due to a difference in compression scaling factor, can be prevented, and a suitable image stabilization can be performed.

Also, with a video captured by the anamorphic lens it is necessary to decompress from the compressed scaling factor by post processing, and in the case of having performed decompression of a compressed image by the scaling factor when an RS distortion still remains, RS distortion will become more prominent than in the case where an anamorphic lens is not attached. However, as described in the present embodiment, since a suitable image blur correction amount tends to decrease in the H direction (horizontal direction) the higher the anamorphic lens compression scaling factor is, it is possible to make a reduced range be a RS distortion correction range. Consequently, even in the case where shaking occurs when the anamorphic lens is attached, it is possible to realize suitable image stabilization control without over correction, and to increase an RS distortion correction amount over the case where an anamorphic lens is not attached. As a result, it is possible to provide an image stabilization device that prevents the RS distortion from being prominent even after having performed decompression by post processing to return from the compression by the scaling factor.

Third Embodiment

Figure 8:
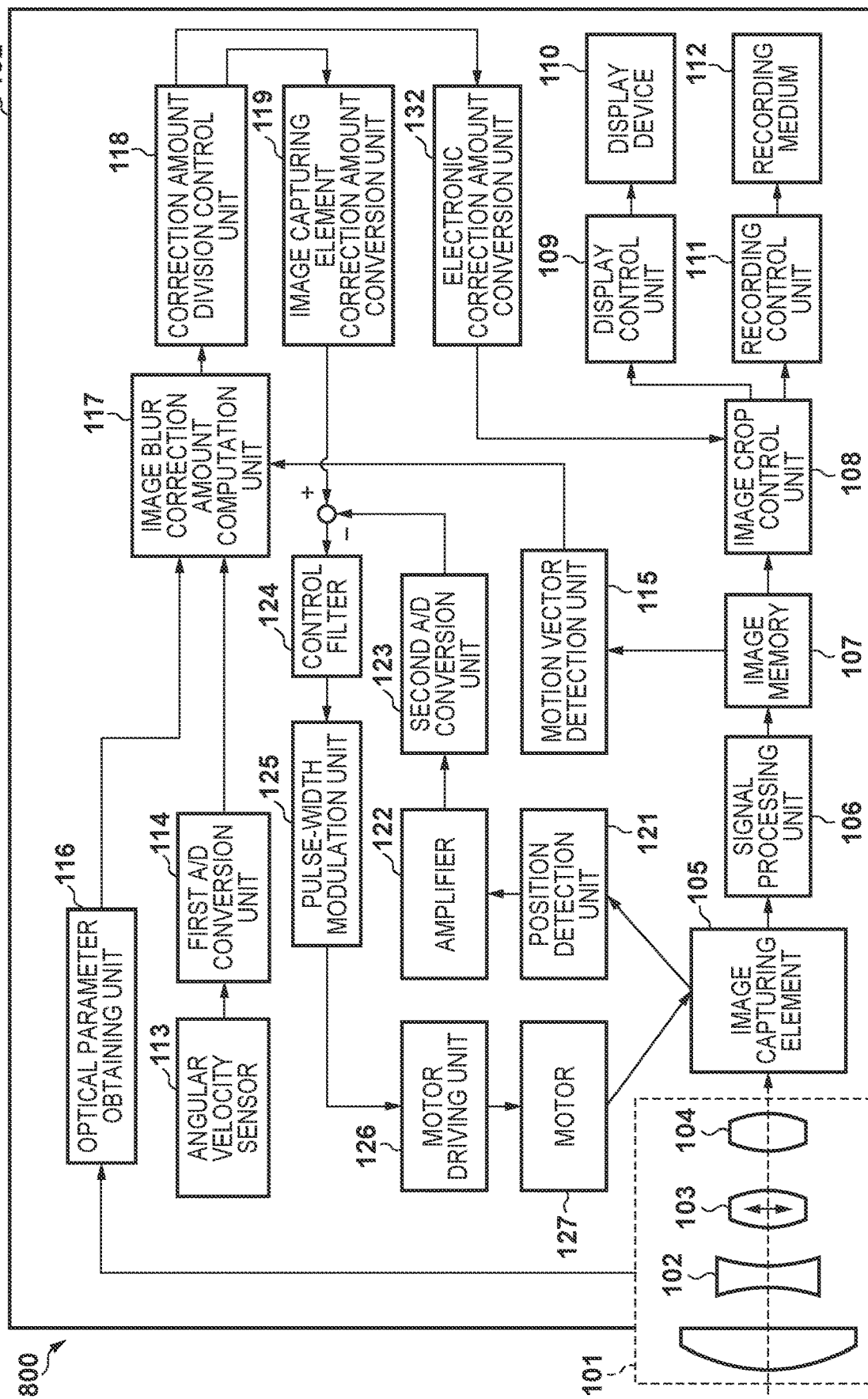
FIG. 8 is a block diagram illustrating configuration of the digital camera according to a third embodiment.

FIG. 8 is a block diagram illustrating a configuration of an interchangeable lens digital camera (image capturing apparatus) 800 for capturing still images and moving images and having an image stabilization apparatus according to a third embodiment of the present invention. Note that elements that are the same as those illustrated in FIG. 1 will be given the same reference numerals, and will not be described.

A camera body 152 of a digital camera 800 illustrated in FIG. 8 corresponds to the configuration of FIG. 1, and an electronic correction amount conversion unit 132 whose control is different to the electronic correction amount conversion unit 120 has been added.

Note that in the present embodiment, the computation of the image blur correction amount corresponding to the anamorphic lens is performed similarly to the correction amount calculation operation of the image blur correction amount computation unit 117 in the first embodiment illustrated in FIG. 3.

Figure 9:
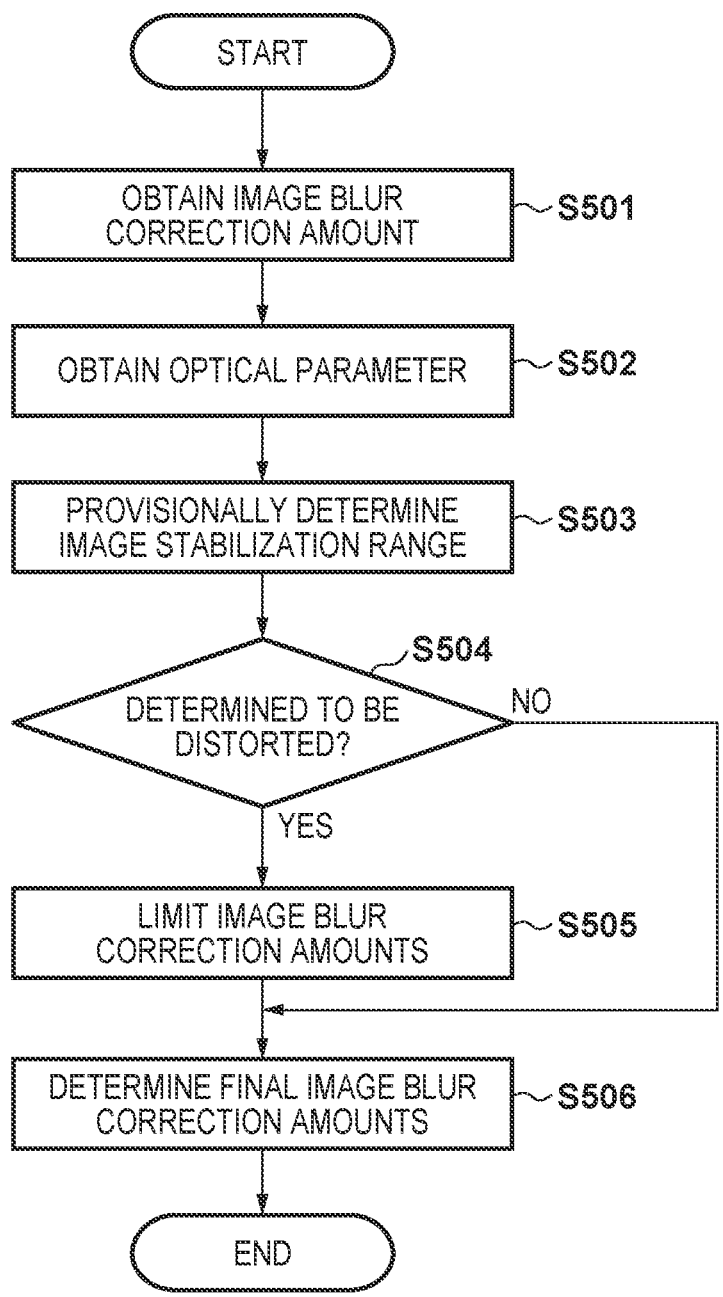
FIG. 9 is a flowchart for describing an electronic correction amount conversion operation in the third embodiment.

FIG. 9 is a flowchart for describing a correction amount conversion operation of the electronic correction amount conversion unit 132 of FIG. 8. Note that the processing illustrated in FIG. 9 is repeatedly executed at a predetermined frequency of 60 Hz or the like in the case of a video signal that complies with the NTSC format, for example.

First, in step S501, the image blur correction amounts H_hom and V_hom in an electronic image blur correction which are supplied by the correction amount division control unit 118 are obtained.

In step S502, optical parameter information of the imaging lens at the time of capturing such as the focal length, the aperture value, the focus position, the distortion rate, the anamorphic lens compression factor, the effective image diameter, or the like is obtained. The obtainment of the information may be performed via electrical communication with the imaging lens 101, or configuration may be taken such that a value inputted manually by using a user interface of the digital camera 100 is obtained.

In step S503, a provisional image stabilization range is calculated. The provisional image stabilization range is set from the effective image diameter information obtained in step S502, a readout range of the image capturing element 105, a movable range of the image crop control unit 108, and the like so as not to hit the edge, and a limitation is put on the image blur correction amounts H_hom and V_hom. The image blur correction amounts after the limitation is applied are H_hom_Limit and V_hom_Limit.

In step S504, a distortion determination (distortion deformation determination) is performed based on the distortion rate obtained in step S502. The obtained distortion rate is Lens_Dist, and by comparison with a certain predetermined distortion rate limit value Dist_Th, it is determined whether Lens_Dist exceeds Dist_Th. In a case where it is determined that the distortion rate Lens_Dist exceeds Dist_Th, the processing advances to step S505, and in the case where it is determined that the distortion rate Lens_Dist has not exceeded Dist_Th, the processing advances to step S506.

Figure 10:
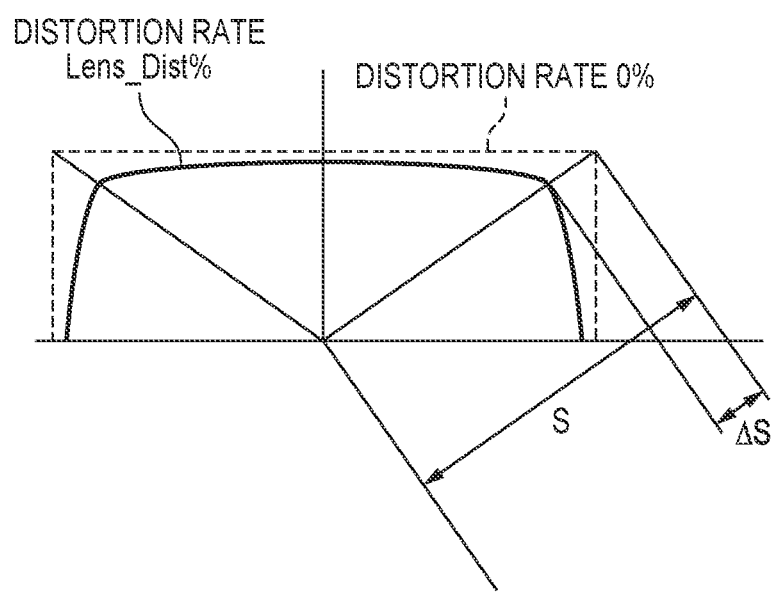
FIG. 10 is a view for describing a distortion rate in the third embodiment.

FIG. 10 is a view for describing a distortion rate Lens_Dist. Where the image height from the center of the image without distortion is S, and difference in image heights compared to a distorted image is ΔS, description according to (Equation 7) is possible for the distortion rate Lens Dist.

$$\text{Lens\_Dist [\%]} = 100 \cdot (\Delta S/S) \qquad \text{(Equation 7)}$$

In step S505, based on the image blur correction amounts H_hom_Limit and V_hom_Limit after the limitation is applied that are calculated in step S503 and Lens_Dist which was obtained in step S502, image blur correction amounts for which a limitation according to the distortion rate is further applied are calculated. The image blur correction amounts after applying the limitation according to the distortion rate are calculated as H_hom_final and V_hom_final respectively.

In step S506, the image blur correction amounts H_hom_final and V_hom_final calculated in step S505 are determined to be the image blur correction amounts used in the image crop control unit 108. Note that in a case where the distortion rate has not exceeded the distortion rate limit value Dist_Th in step S504, the image blur correction amounts H_hom_Limit and V_hom_Limit after the limitation has been applied which are calculated in step S503 are determined in step S506 to be the image blur correction amounts used by the image crop control unit 108.

As described above, by virtue of the present embodiment, when an anamorphic lens is attached, a correction amount is changed for each image stabilization axis, and it is possible to prevent an erroneous image stabilization due to a difference in compression scaling factor, and a suitable image stabilization is possible.

Also, in a case where a shake occurred when an imaging lens with greater than or equal to a predetermined distortion rate is attached, it is possible to realize maximal image stabilization control within a range in which suitable image stabilization is possible.

Also, in the present embodiment, description was given for a case where the second image stabilization unit (the image stabilization by movement of the image capturing element) and the third image stabilization unit (electronic image blur correction) are used. However, configuration may be taken such that the present invention is applied in cases in which the first image stabilization unit (image stabilization by a shift lens) is used in place of the second image stabilization unit, or all three types of image stabilization unit are used.

Also, in each embodiment described above, description was given using an angular velocity sensor as an example of shake detection means, but other shake detection means may be employed. For example, configuration may be taken such that a shake amount is calculated from an acceleration using an acceleration sensor, and shake is detected by combination of a plurality of sensors, and a shake amount of the apparatus calculated accordingly.

Also, shake detection means such as an angular velocity sensor may be of a configuration comprised in the imaging lens 101 rather than the camera body 150. Alternatively, shake detection means such as the angular velocity sensor may be comprised in both the camera body 150 and the imaging lens 101, and configuration may be such that a shake of the digital camera 100 is detected by using both shake detection means.

Also, in each of the above described embodiments, description was given using an anamorphic lens as an example of an imaging lens with different compression scaling factors for the horizontal direction and the vertical direction of the captured video, but another imaging lens may be used. Also, configuration may be taken such that the camera body 150 obtains lens type information such as a lens ID from the imaging lens, and obtains (determines) the imaging lens optical parameter information based on optical parameter information for each lens type stored in advance in a memory of the camera body 150 and the obtained lens type information.

Other Embodiments

Embodiment(s) of the present invention can also be realized by a computer of a system or apparatus that reads out and executes computer executable instructions (e.g., one or more programs) recorded on a storage medium (which may also be referred to more fully as anon-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-152170, filed Aug. 22, 2019 which is hereby incorporated by reference herein in its entirety.

What is claimed is:

1. An image stabilization apparatus, comprising:
at least one processor or circuit configured to function as:
a calculation unit configured to, based on a detection result of shake detector for detecting a shake of an image capturing apparatus, calculate an image blur correction amount for correcting an image blur, wherein
the calculation unit, based on information of an imaging lens that is used when capturing a captured image, calculates the image blur correction amount at a different scaling factor for each of a plurality of axes of a two-dimensional plane of the captured image.

2. The image stabilization apparatus according to claim 1, wherein the plurality of axes of the two-dimensional plane are two axes that are orthogonal to each other.

3. The image stabilization apparatus according to claim 2, wherein the plurality of axes of the two-dimensional plane are an axis in a horizontal direction and an axis in a vertical direction.

4. The image stabilization apparatus according to claim 3, wherein in the imaging lens, image scaling for a horizontal direction and image scaling of a vertical direction differ.

5. The image stabilization apparatus according to claim 4, wherein the imaging lens is a lens for compressing a subject image in a horizontal direction when capturing the image.

6. The image stabilization apparatus according to claim 5, wherein the calculation unit calculates the image blur correction amount in the horizontal direction to be smaller than the image blur correction amount in the vertical direction.

7. The image stabilization apparatus according to claim 6, wherein the at least one processor or circuit is configured to further function as a control unit configured to, based on the information of the imaging lens, change a correction range for correcting an image blur.

8. The image stabilization apparatus according to claim 7, wherein in a case where image scaling in the horizontal direction and image scaling in the vertical direction of the imaging lens are different, the control unit reduces the correction range for correcting the image blur more than in a case where image scaling in the horizontal direction and image scaling in the vertical direction of the imaging lens are the same.

9. The image stabilization apparatus according to claim 7, wherein the control unit, based on the information of the imaging lens, further changes a distortion correction range for correcting a rolling shutter distortion of a captured image.

10. The image stabilization apparatus according to claim 9, wherein the control unit, in a case where image scaling in the horizontal direction and image scaling in the vertical direction of the imaging lens are different, increases the distortion correction range more than in a case where image scaling in the horizontal direction and image scaling in the vertical direction of the imaging lens are the same.

11. The image stabilization apparatus according to claim 7, wherein the control unit, based on the information of the imaging lens, further changes the correction range for correcting a distortion deformation of the captured image.

12. The image stabilization apparatus according to claim 1, wherein the shake detector includes an angular velocity sensor.

13. The image stabilization apparatus according to claim 12, the shake detector includes motion vector detection circuit that detects a motion vector between a plurality of images.

14. The image stabilization apparatus according to claim 13,
the calculation unit does not apply the different scaling factor for each of a plurality of axes of a two-dimensional plane of the captured image, for a detection result of the motion vector detection circuit.

15. The image stabilization apparatus according to claim 1, wherein the shake detector includes an acceleration sensor.

16. The image stabilization apparatus according to claim 1, wherein by causing a lens within the imaging lens to move based on the image blur correction amount, an image blur is corrected by changing a relative position of a subject image and an image capturing element.

17. The image stabilization apparatus according to claim 1, wherein by causing an image capturing element to move based on the image blur correction amount, an image blur is corrected by changing a relative position of a subject image and the image capturing element.

18. The image stabilization apparatus according to claim 1, wherein based on the image blur correction amount, an image blur is corrected electrically.

19. The image stabilization apparatus according to claim 18, wherein an image blur is corrected electrically based on the image blur correction amount in relation to a captured image for which de-squeeze processing has not been executed.

20. The image stabilization apparatus according to claim 1, wherein based on the image blur correction amount, by causing at least one of a lens in the imaging lens and an image capturing element to move, an image blur is corrected by changing a relative position of a subject image and the image capturing element, and also an image blur is electrically corrected.

21. The image stabilization apparatus according to claim 1, wherein the image stabilization apparatus is an image capturing apparatus.

22. A method of controlling an image stabilization apparatus, the control method comprising:
based on a detection result of shake detector for detecting a shake of an image capturing apparatus, calculating an image blur correction amount for correcting an image blur, wherein
based on information of an imaging lens that is used when capturing a captured image, the image blur correction amount at a different scaling factor for each of a plurality of axes of a two-dimensional plane of the captured image is calculated.

23. A non-transitory computer-readable storage medium storing a program for causing a computer to execute a method of controlling an image stabilization apparatus, the control method comprising:
based on a detection result of shake detector for detecting a shake of an image capturing apparatus, calculating an image blur correction amount for correcting an image blur, wherein
based on information of an imaging lens that is used when capturing a captured image, the image blur correction amount at a different scaling factor for each of a plurality of axes of a two-dimensional plane of the captured image is calculated.

\* \* \* \* \*